Feb. 27, 1968   J. W. ANDERSON ET AL   3,370,977
METHOD OF PREPARING ELECTRODED CERAMICS FOR BONDING
Filed Aug. 25, 1965

INVENTORS
JAMES W. ANDERSON
BOBBY L. JOYNER

BY Wenderoth, Lind & Ponack

ATTORNEYS 3,370,977
METHOD OF PREPARING ELECTRODED CERAMICS FOR BONDING
James W. Anderson and Bobby L. Joyner, State College, Pa., assignors to Linden Laboratories, Inc., State College, Pa., a corporation of Pennsylvania
Filed Aug. 25, 1965, Ser. No. 482,419
2 Claims. (Cl. 117—215)

ABSTRACT OF THE DISCLOSURE

The present invention concerns a method of preparing electroded ceramics for bonding, comprising directing against the free surface of an electrode on a ceramic body a stream of particles having sharp corners thereon and of a hard material which is nonconductive and flowing said stream against the electrode surface at a rate such that the momentum of the particles causes at least some of them to be embedded in the electrode surface, whereby when a bonding agent is placed on the electrode surface, the projecting particles provide projections to which the bonding agent can attach to form a good bond between the bonding agent and the electrode.

---

The present invention relates to a method of preparing ceramic bodies which have electrodes thereon for bonding to other materials.

In order to use many ceramic bodies for such devices as capacitors or piezoelectric bodies, it is necessary to apply to at least one surface of such a ceramic body an electrode of conventional electrode material. It has been found that in practice it is also frequently necessary to then bond the thus electroded ceramic body to another material, such as for example another ceramic body or a metal body, through the electrode. Difficulty in forming such further bonds has been experienced because of the relatively poor bonding surface which the free surface of the electrode presents.

It is an object of the present invention to provide a method of treating this free surface of the electrode so that it can readily be bonded to another body by means of a conventional bonding agent.

In carrying out the present invention, sharp pieces of a hard nonconductive material such as silica, for example sand, are blown against the free surface of the electrode in such a way that at least some of the particles of silica are embedded in the material of the electrode and project from that surface, and provide projections which are firmly secured to the electrode surface to which the bonding agent can attach, so that a good bond can be formed between the bonding agent and the electrode.

Figure 1:
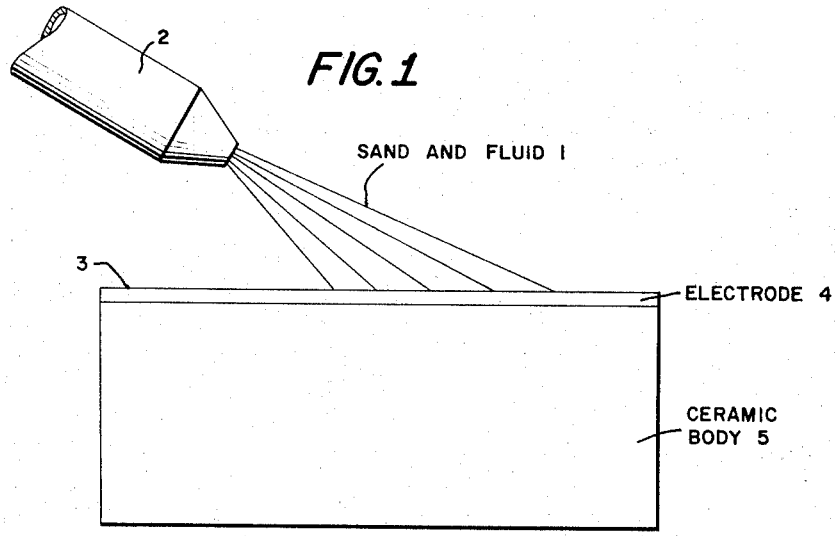
Figure 2:
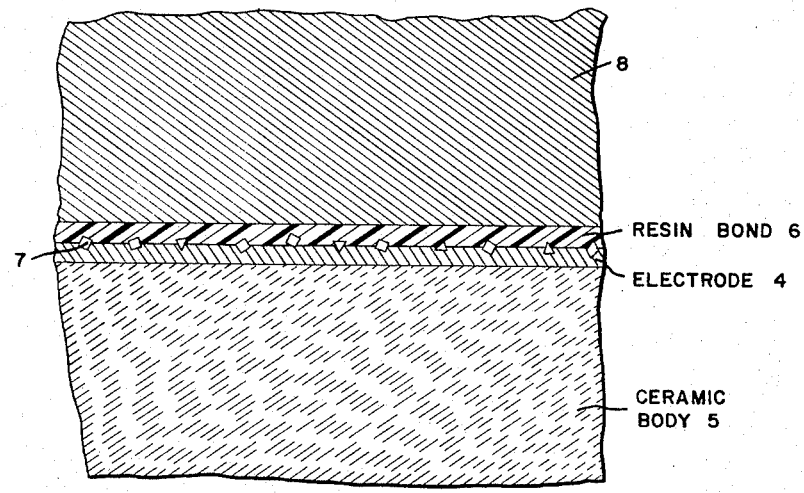

The invention will be described more fully in the following specification with reference to the accompanying drawings, in which:

FIG. 1 is a schematic view of the step of blowing particles of silica against the free surface of the electrode on an electroded ceramic body; and FIG. 2 is a sectional view, on an enlarged scale through a bond between an electroded ceramic body treated according to the method of the present invention and another body.

The method according to the present invention and as shown diagrammatically in FIG. 1 comprises directing a stream 1 of fluid, preferably a gaseous fluid, through a fluid directing means, such as a nozzle 2, against the free surface 3 of an electrode 4 on a ceramic body 5. Particles of silica which have sharp corners thereon, for example sharp white sand, are fed into the stream of fluid flowing into the nozzle and are directed against the free surface 3 of the electrode 4. The velocity of the gaseous fluid 1 and the distance the nozzle 2 is spaced from the surface 3 are adjusted so that the momentum of the particles of sand are such that some of the particles have the sharp corners thereof embedded in the surface 3. These particles remain embedded while the remainder of the particles are carried off by the flow of the fluid.

The thus treated electrode surface 3 is then in condition to have a bonding agent applied thereto and be bonded to another body. As seen in FIG. 3, when the bonding agent 6 is applied against the surface 3, the embedded particles of sand 7 act as projections to which the bonding agent 6 can attach so as to form a secure connection between the bonding agent and the electrode 4. The bonding agent 6 is secured to the body 8 which is being bonded to the electroded ceramic body 5 in the usual manner.

The following specific example will show how the method is carried out in connection with a specific ceramic body.

Example I

A body of barium titanate shaped to form a piezoelectric body, has a silver electrode formed on the opposite surfaces thereof by conventional methods. The piezoelectric body is to be bonded to an aluminum plate, and in order to prepare the free surface of the silver electrode on one side of the body, a nozzle having a nozzle opening of about 1/8" diameter is held about 6" from the surface of the silver electrode, and air at about 60 p.s.i.g. is forced through the nozzle and against the electrode. A sharp white sand, i.e. sand in which the particles have sharp corners thereon, with a particle size of about 35 mesh is fed into the nozzle at a rate such that it will freely pass through the nozzle, and the stream of sand in the air is directed against the surface of the electrode for about 2 seconds on each square inch of surface.

Thereafter, the thus treated electrode is bonded to an aluminum body using a conventional epoxy resin bonding agent and conventional bonding techniques for such a resin.

Microscopic examination of the electrode surface prior to bonding it to the aluminum body shows that particles of the sand are embedded in the electrode surface and project therefrom.

Strength tests on the bond between the aluminum body and the electroded ceramic body showed a large increase in bond strength as compared with an identical bond between an untreated electroded ceramic body and an aluminum body.

The method of the present invention can be applied to many different electrode materials on various ceramic bodies. Conventional gold, copper or other conductive electrode alloys can be treated in the manner described above when they are formed as electrodes on ceramic bodies such as the barium titanate set forth in Example I, lead zirconate-titanate bodies, and the like. Areas from 1/4 sq. in. up can be treated, and the pressure of the fluid, the size of the nozzle and its distance from the surface can be varied depending on the size of the particles of silica, it being necessary to cause them to impinge on the electrode surface with sufficient momentum that at least some of them are embedded in that surface.

It is thought that the invention and its advantages will be understood from the foregoing descripiton and it is apparent that various changes may be made in the form, construction and arrangement of the parts without departing from the spirit and scope of the invention or sacrificing its material advantages, the form herein-

What is claimed is:

1. A method of preparing electroded ceramics for bonding, comprising directing against the free untreated surface of an electrode on a ceramic body a stream of particles having sharp corners thereon and of a hard material which is nonconductive, said particles being in their natural state, and flowing said stream against the electrode surface at a rate such that the momentum of the particles causes at least some of them to be embedded in the electrode surface, whereby when a bonding agent is placed on the electrode surface, the projecting particles provide projections to which the bonding agent can attach to form a good bond between the bonding agent and the electrode.

2. A method of preparing electroded ceramics for bonding, comprising directing against the free untreated surface of an electrode on a ceramic body a stream of a gaseous fluid having silica particles therein said particles being in their natural state and having sharp corners thereon, and flowing said stream of fluid and silica particles against the electrode surface at a rate such that the momentum of the particles causes at least some of them to be embedded in the electrode surface, whereby when a bonding agent is placed on the electrode surface, the projecting particles provide projections to which the bonding agent can attach to form a good bond between the bonding agent and the electrode.

References Cited
UNITED STATES PATENTS

| | | | |
|---|---|---|---|
| 1,869,105 | 7/1932 | Johnson | 156—153 |
| 2,536,183 | 1/1951 | Jamieson | 161—258 |
| 2,907,671 | 10/1959 | Duvivier | 117—16 |

EARL M. BERGERT, *Primary Examiner.*

M. L. KATZ, *Assistant Examiner.*